(12) United States Patent
Park et al.

(10) Patent No.: US 11,821,834 B2
(45) Date of Patent: Nov. 21, 2023

(54) METHOD AND APPARATUS FOR MEASURING THREE-DIMENSIONAL REFRACTIVE INDEX TENSOR

(71) Applicants: TOMOCUBE, INC., Daejeon (KR); KOREA ADVANCED INSTITUTE OF SCIENCE AND TECHNOLOGY, Daejeon (KR)

(72) Inventors: Yongkeun Park, Daejeon (KR); Seungwoo Shin, Daejeon (KR)

(73) Assignees: TOMOCUBE, INC., Daejeon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/753,479

(22) PCT Filed: Jan. 7, 2021

(86) PCT No.: PCT/KR2021/000157
§ 371 (c)(1),
(2) Date: Mar. 3, 2022

(87) PCT Pub. No.: WO2021/172734
PCT Pub. Date: Sep. 2, 2021

(65) Prior Publication Data
US 2022/0404267 A1 Dec. 22, 2022

(30) Foreign Application Priority Data
Feb. 26, 2020 (KR) .................. 10-2020-0023424

(51) Int. Cl.
*G01N 21/23* (2006.01)
*G01B 9/02* (2022.01)
(Continued)

(52) U.S. Cl.
CPC .............. *G01N 21/23* (2013.01); *G01B 9/02* (2013.01); *G01N 21/41* (2013.01); *G01N 21/45* (2013.01); *G01N 2021/1787* (2013.01)

(58) Field of Classification Search
CPC ........ G01N 21/23; G01N 21/41; G01N 21/45; G01N 2021/1787
See application file for complete search history.

(56) References Cited

U.S. PATENT DOCUMENTS

| 7,310,145 B2 * | 12/2007 | Abuzaina ............... G01N 21/23 356/365 |
| 7,336,359 B1 | 2/2008 | Simpson et al. |
| 2017/0357084 A1 * | 12/2017 | Park ................... G02B 26/0833 |

FOREIGN PATENT DOCUMENTS

| JP | 2000097805 A | 4/2000 |
| JP | 2002504673 A | 2/2002 |

(Continued)

OTHER PUBLICATIONS

Hongladarom, K. et al. "Measurement of the full refractive index tensor in sheared liquid-crystalline polymer solutions". Macromolecules, 1994, 27, 2, Jan. 1, 1994, pp. 483-489. (Year: 1994).*

(Continued)

*Primary Examiner* — Michael A Lyons
(74) *Attorney, Agent, or Firm* — Hoffman Warnick LLC

(57) ABSTRACT

A method and apparatus for measuring a 3-D refractive index tensor are presented. The method for measuring a 3-D refractive index tensor according to an embodiment comprises the steps of: controlling incident light of a plane wave with respect to at least one angle and polarization; and measuring, in a polarization-dependent manner, the 2-D diffracted light of a specimen with respect to the incident light incident at the at least one angle and polarization, wherein the birefringence value and the 3-D structure of an (Continued)

alignment direction of molecules in the specimen having birefringence may be measured.

8 Claims, 5 Drawing Sheets

(51) Int. Cl.
*G01N 21/41* (2006.01)
*G01N 21/45* (2006.01)
*G01N 21/17* (2006.01)

(56) References Cited

FOREIGN PATENT DOCUMENTS

| JP | 2005003386 A | | 1/2005 |
|---|---|---|---|
| JP | 2013257574 A | * | 12/2013 |
| KR | 10-2010-0038101 A | | 3/2015 |
| KR | 10-2018-0055994 A | | 7/2018 |
| WO | 2018049476 | | 3/2018 |

OTHER PUBLICATIONS

English translation of KR 10-2018-0055994 A. Obtained from Espacenet on May 11, 2023. (Year: 2023).*

English translation of JP 2005-003386 A. Obtained from Espacenet on May 11, 2023. (Year: 2023).*

PCT International Search Report for International Application No. PCT/KR2021/000157, dated Mar. 30, 2021, 7 pages.

Kyoohyun Kim et al., "Optical diffraction tomography techniques for the study of cell pathophysiology," J of Biomedical Photonics & Eng 2(2), Jun. 14, 2016, 16 pages.

Emil Wolf, "Three-Dimensional Structure Determination of Semi-Transparent Objects From Holographic Data," Optics Communications, Sep./Oct. 1969, vol. 1, No. 4, pp. 153-156.

YongKeun Park et al., "Quantitative phase imaging in biomedicine," Review Article, Nature Photonics, vol. 12, Oct. 2018, pp. 578-589.

Tristan Colomb et al., "Polarization imaging by use of digital holography," Applied Optics, Jan. 1, 2002, vol. 41, No. 1.

Zhuo Wang et al., "Jones phase microscopy of transparent and anisotropic samples," Optics Letters, vol. 33, No. 11, Jun. 1, 2008.

Youngchan Kim, "Polarization holographic microscopy for extracting spatio-temporally resolved Jones matrix," Optics Express, Apr. 23, 2012, vol. 20, No. 9.

Shin et al., "Reconstruction of three-dimensional refractive index tensor by solving an inverse scattering problem of vector fields diffracted from an optically anisotropic object," Session 3: QPI Methodologies III, Feb. 1, 2020.

European Search Report for Application No. 21761599.6, dated Jun. 22, 2023, 5 pages.

Shin Seunwoo et al., "Optical diffraction tomography using a digital micromirror device for stable measurements of 4D refractive index tomography of cells," Progress in Biomedical Optics and Imaging, SPIE—International Society for Optical Engineering, vol. 9718, Mar. 9, 2016, 8 pages.

Shin Seunwoo et al., "Tomographic measurement of dielectric tensors at optical frequency," Nature Materials, Nature Publishing Group, vol. 21, No. 3, Mar. 1, 2022, pp. 317-324.

* cited by examiner

METHOD AND APPARATUS FOR MEASURING THREE-DIMENSIONAL REFRACTIVE INDEX TENSOR

TECHNICAL FIELD

The following embodiments relate to a method and apparatus for measuring a three-dimensional (3-D) refractive index tensor, and more particularly, to a method and apparatus for measuring a 3-D refractive index tensor, which implements the restoration of 3-D birefringence.

BACKGROUND ART

Optical diffraction tomography (ODT) can quantitatively restore a distribution of 3-D refractive indices (RIs) of a sample in a non-destructive manner, and thus is applied and used in various fields, such as the check of a defect in a plastic lens and the measurement of a distribution of fine 3-D temperatures, as well as biological research such as a bacteria, a cell, and a tissue (Non-patent Document 1-3).

However, because the existing ODT technology requires a scalar wave assumption that all wave surfaces according to the vibration direction of an electric field of light are the same, the application of the technology has been limited to a birefringence sample having a different refractive index depending on its direction.

Non-patent Documents 4 to 6 are precedent researches capable of measuring a two-dimensional (2-D) phase delay image for each polarization of a sample measured by using a 2-D quantitative phase imaging technology. Korean Patent No. 10-1461235 describes a technology about a probe for acquiring polarization-sensitive optical coherence image for a biological tissue test, a probe for detecting polarization-sensitive optical coherence image, and a method for driving a system of polarization-sensitive optical coherence image for a biological tissue test.

There was a technology capable of measuring a 2-D optical field image for each polarization of a sample having birefringence (Non-patent Documents 4-6) or a 2-D optical field image for each polarization according to a depth (Korean Patent No. 10-1461235) depending on the polarization of incident light, but a theory or a methodology capable of measuring a 3-D refractive index tensor, that is, a fundamental physical quantity of a sample that generates such a birefringence phenomenon, has not been known.

(Non-patent Document 1) Kim, K., et al. (2016). "Optical diffraction tomography techniques for the study of cell pathophysiology." arXiv preprint arXiv: 1603.00592.
(Non-patent Document 2) Wolf, E. (1969). "Three-dimensional structure determination of semi-transparent objects from holographic data." Optics Communications 1(4): 153-156.
(Non-patent Document 3) Park, Y. (2018). "Quantitative phase imaging in biomedicine." Nature Photonics 12(10): 578-589.
(Non-patent Document 4) Colomb, T., Dahlgren, P., Beghuin, D., Cuche, E., Marquet, P., & Depeursinge, C. (2002). Polarization imaging by use of digital holography. Applied optics, 41(1), 27-37.
(Non-patent Document 5) Wang, Z., Millet, L. J., Gillette, M. U., & Popescu, G. (2008). Jones phase microscopy of transparent and anisotropic samples. Optics letters, 33(11), 1270-1272.
(Non-patent Document 6) Kim, Y., Jeong, J., Jang, J., Kim, M. W., & Park, Y. (2012). Polarization holographic microscopy for extracting spatio-temporally resolved Jones matrix. Optics Express, 20(9), 9948-9955.

DISCLOSURE

Technical Problem

Embodiments describe a method and apparatus for measuring a three-dimensional (3-D) refractive index tensor, and more specifically, provide a technology capable of measuring an accurate birefringence value and a 3-D direction of molecules in a sample having birefringence.

Embodiments provide a method and apparatus for measuring a 3-D refractive index tensor, which can accurately measure a distribution of 3-D birefringence of a sample including a birefringence material and also obtain information on a 3-D alignment direction of molecules.

Furthermore, embodiments provide a method and apparatus for measuring a 3-D refractive index tensor, which can optically directly measure the results of interactions between molecules within a closed space and is capable of selective 3-D observation for a frame and a muscle fiber structure in a biological cell or a tissue sample without additional labeling, by observing a 3-D molecule alignment direction of liquid crystal drops.

Technical Solution

A method of measuring a three-dimensional (3-D) refractive index tensor according to an embodiment may include controlling incident light of a plane wave with at least one angle and a polarization; and measuring, in a polarization-dependent way, two-dimensional (2-D) diffraction light of a sample for the incident light incident at the at least one angle and with the polarization, and a 3-D structure of a birefringence value and an alignment direction of molecules in the sample having birefringence may be measured.

The controlling incident light of a plane wave with at least one angle and a polarization may include controlling an angle of the incident light.

The controlling an angle of the incident light may control the angle of the incident light by using at least one of a method of moving a location of a dual mirror by controlling it with a motor, etc., a agalvanometric mirror, a deformable mirror, a digital micromirror device, a liquid-crystal spatial light modulator and a 2-D micro electro mechanical system mirror (MEMS mirror).

The controlling incident light of a plane wave with at least one angle and a polarization may include controlling a polarization of the incident light.

The controlling a polarization of the incident light may control the polarization of the incident light by using at least one of a polarization beam splitter, an optical fiber polarization controller, a rotating polarization plate, a liquid-crystal retarder and a meta surface.

The measuring 2-D diffraction light of a sample for the incident light in a polarization-dependent way may use temporal and spatial intensity modulation interferometry including at least any one of Mach-Zehnder interferometry, phase shifting interferometry and a quantitative phase imaging unit or use a method of measuring the 2-D diffraction light using at least one of transport of intensity equation and Fourier ptychography. Furthermore, the 2-D diffraction light may be measured in a polarization-dependent way by using a rotating polarization plate, a liquid-crystal retarder, a meta surface, etc.

The birefringence value and the alignment direction of molecules in the sample having birefringence may be restored into a single layer in a 3-D manner by diagonalizing a measured refractive index tensor by using a tensor feature of the birefringence being due to a spatial rotation of the sample having birefringence.

An apparatus for measuring a three-dimensional (3-D) refractive index tensor according to another embodiment may include an incident light controller configured to control incident light of a plane wave with at least one angle and a polarization; and a diffraction light measurement unit configured to measure, in a polarization-dependent way, two-dimensional (2-D) diffraction light of a sample for the incident light incident at the at least one angle and with the polarization, and a 3-D structure of a birefringence value and an alignment direction of molecules in the sample having birefringence may be measured.

The incident light controller may include an angle controller controlling an angle of the incident light, and a polarization controller controlling a polarization of the incident light.

The birefringence value and the alignment direction of molecules in the sample having birefringence may be restored into a single layer in a 3-D manner by diagonalizing a measured refractive index tensor by using a tensor feature of the birefringence being due to a spatial rotation of the sample having birefringence.

Advantageous Effects

According to embodiments, there can be provided the method and apparatus for measuring a 3-D refractive index tensor, which can accurately measure a distribution of 3-D birefringence of a sample including a birefringence material and also obtain information on a 3-D alignment direction of molecules.

Furthermore, according to embodiments, there can be provided the method and apparatus for measuring a 3-D refractive index tensor, which can optically directly measure the results of interactions between molecules within a closed space and is capable of selective 3-D observation for a frame and a muscle fiber structure in a biological cell or a tissue sample without additional labeling, by observing a 3-D molecule alignment direction of liquid crystal drops.

BEST MODE

Figure 1:
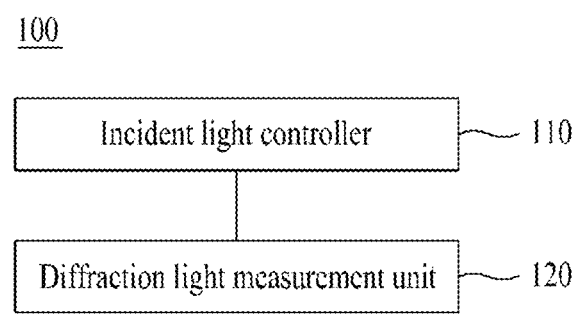
FIG. 1 is a block diagram schematically illustrating an apparatus for measuring a 3-D refractive index tensor according to an embodiment.

Hereinafter, embodiments are described with reference to the accompanying drawings. However, the described embodiments may be modified in various other forms, and the scope of the present disclosure is not restricted by the following embodiments. Furthermore, various embodiments are provided to more fully describe the present disclosure to a person having average knowledge in the art. The shapes, sizes, etc. of elements in the drawings may be exaggerated for a clear description.

The following embodiments relate to a method and apparatus for measuring a 3-D refractive index tensor, and have an object of implementing the restoration of 3-D birefringence of a birefringence sample (sample) by theoretically expanding the existing optical diffraction tomography (ODT) technology. Eventually, the embodiments can measure a more accurate birefringence value and a 3-D direction of molecules in a sample having birefringence.

Embodiments relate to a technology which implements the restoration of 3-D birefringence. To this end, the point is to develop a theory which overcomes the limit of the existing theory and to develop measuring equipment for actually implementing a theory.

The development of the theory which overcomes the limit of the existing theory is first described below.

The point of the development of the theory is to solve a vector wave equation based on a vector wave and a refractive index tensor without being limited to a scalar wave assumption, that is, the limit of the existing theory.

Assuming a weakly scattering sample, a vector wave equation, such as the following equation, may be derived within a material.

$$\nabla^2 \vec{E}(\vec{r}) + k^2 \overleftrightarrow{n}^2(\vec{r}) \vec{E}(\vec{r}) = 0 \quad \text{[Equation 1]}$$

wherein k is the size of a wave vector, $\overleftrightarrow{n}$ is a refractive index tensor, and $\vec{E}$ is an electric field vector. [42] The above wave equation may be represented as in the following equation by expressing the wave equation in the form of an inhomogeneous Helmholtz equation.

$$(\nabla^2 + k^2)\vec{E}(\vec{r}) = -4\pi \overleftrightarrow{F}(\vec{r})\vec{E}(\vec{r}) \quad \text{[Equation 2]}$$

wherein $$\overleftrightarrow{F}(\vec{r}) = \frac{k^2}{4\pi}\left(\overleftrightarrow{n^2}(\vec{r}) - \overleftrightarrow{I}\right)$$

is a scattering potential tensor.

In order to calculate the analytic solution of [Equation 2], Rytov approximation may be used. In an Rytov method, a wave surface may be expressed as an exponent function, and a weakly diffracted wave surface may be meaningfully approximated only up to the first degree among the expressions of a grade of an exponent, and may be represented as in the following equation.

$$\vec{E}(\vec{r}) = e^{\vec{\psi}_x(\vec{r})} = \begin{pmatrix} e^{\psi_x(\vec{r})} \\ e^{\psi_y(\vec{r})} \\ e^{\psi_z(\vec{r})} \end{pmatrix} \quad \text{[Equation 3]}$$

wherein $\psi_x = \ln E_x$.

An analytic solution calculated by using [Equation 2] as the Rytov approximation of [Equation 3] may be represented as in the following equation.

$$\tilde{F}(\vec{k}-\vec{k}_0)\vec{p}_0 = \vec{p} \circ \left[\frac{k_z}{2\pi i}\delta(\vec{k}-\vec{k}_0) * \tilde{\psi}(\vec{k})\right]$$ [Equation 4]

wherein $\vec{P}_0$ is a polarization vector of an plane wave of incident light, and δ is a Dirac delta function. Furthermore, a subscript 0 indicates a feature of the incident light.

According to energy conservation, it has been well known that a refractive index tensor needs to be a symmetric matrix. Accordingly, even in this embodiment, it may be assumed that the refractive index tensor is a symmetric matrix having six components that need to be measured.

Since two vertical polarization vectors may be defined for each one incident light angle, a diffracted wave surface may be represented as a total of six vector components. However, since one component of the two vertical polarization vectors is always dependent on each other, an underdetermined system including five independent equations and six parameters of a refractive index tensor is obtained.

In order to solve such a problem, a fine inclination method may be provided. Since the location of scattering potential affecting the diffracted wave surface is $\tilde{F}(\vec{k}-\vec{k}_0)$, the underdetermined system still remains because a scattering potential signal at a different location is measured when an incident angle is changed. However, if the incident angle is very finely changed, a diffracted wave surface may be represented by using scattering potential before the angle is finely changed and a differential thereof, and vector components vertical to the polarization vector of the incident light may be produced. This may be represented as in the following equation.

$$\tilde{F}(\vec{k}-\vec{k}_0 + \vec{\delta k}) = \tilde{F}(\vec{k}-\vec{k}_0) + \frac{\partial \tilde{F}}{\partial \vec{k}}\vec{\delta k}$$ [Equation 5]

In the expression of [Equation 5], if a Fourier transform feature of a differential function is used, the following equation may be represented.

$$IFT[(\vec{k}-\vec{k}_0+\vec{\delta k})]=F(\vec{r})\times(1-i\vec{r}\cdot\vec{\delta k})$$ [Equation 6]

wherein $F(\vec{r})=IFT[\tilde{F}(\vec{k}-\vec{k}_0)]$.

That is, additional information necessary for the underdetermined system may be inputted from the measured vector wave surface by finely inclining the incident angle.

Finally, the birefringence value and the alignment direction of molecules may be restored into a single layer in a 3-D manner by diagonalizing a measured refractive index tensor by using the tensor feature of the birefringence being due to the spatial rotation of the birefringence material.

Next, the development of measuring equipment for actually implementing the developed theory is described.

FIG. 1 is a block diagram schematically illustrating an apparatus for measuring a 3-D refractive index tensor according to an embodiment.

Referring to FIG. 1, the point of an actual implementation of the present technology is to control incident light of a plane wave with various angles and a polarization, and to measure a scattered optical field in a polarization-dependent way.

The existing optical diffraction tomography (ODT) technology controls the angle of incident light and measure corresponding scattering wave surfaces, but is different from the technology according to the present embodiments in that the polarization of incident light is controlled and a polarization-dependent wave surface is measured.

An apparatus 100 for measuring a 3-D refractive index tensor according to an embodiment may include an incident light controller 110 for controlling incident light of a plane wave with at least one angle and a polarization, and a diffraction light measurement unit 120 for measuring 2-D diffraction light of a sample for incident light incident at the at least one angle and with the polarization in a polarization-dependent way, and through this, it may measure a 3-D structure of a birefringence value and the alignment direction of molecules in a sample having birefringence.

The apparatus 100 for measuring the 3-D refractive index tensor is more specifically described.

Figure 2:
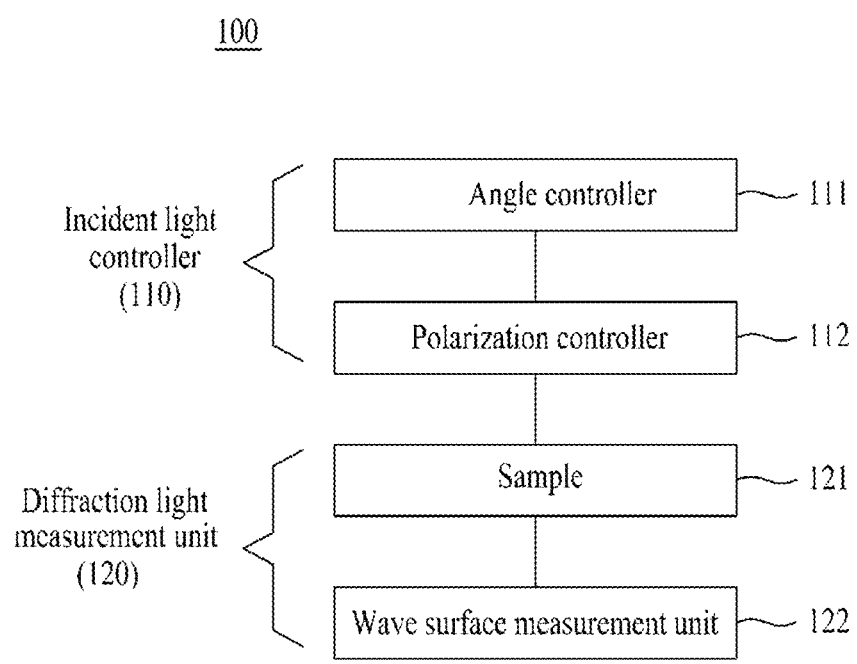
FIG. 2 is a block diagram illustrating the apparatus for measuring a 3-D refractive index tensor according to an embodiment.

FIG. 2 is a block diagram illustrating the apparatus for measuring a 3-D refractive index tensor according to an embodiment.

Referring to FIG. 2, the apparatus 100 for measuring a 3-D refractive index tensor according to an embodiment may include the incident light controller 110 and the diffraction light measurement unit 120. In this case, the incident light controller 110 may include an angle controller 111 and a polarization controller 112, and the diffraction light measurement unit 120 may include a wave surface measurement unit 122. Furthermore, according to an embodiment, the diffraction light measurement unit 120 may further include a sample 121.

The incident light controller 110 may control incident light of a plane wave with at least one angle and a polarization.

In this case, the incident light controller 110 may include the angle controller 111, and the angle controller 111 may control the angle of the incident light.

A device capable of rapidly and stably controlling the angle of incident light includes a dual mirror, a galvanometric mirror, a deformable mirror, a digital micromirror device, a liquid-crystal spatial light modulator, a 2-D micro electro mechanical system mirror (MEMS mirror), etc. For example, the angle of the incident light can be rapidly and stably controlled by moving a location of a dual mirror by controlling it with a motor, etc.

Furthermore, the incident light controller 110 may further include the polarization controller 112, and the polarization controller 112 may control the polarization of the incident light.

A method of controlling the polarization of incident light includes methods using a polarization beam splitter, an optical fiber polarization controller, a rotating polarization plate, a liquid-crystal retarder, a meta surface, etc.

The diffraction light measurement unit 120 may measure 2-D diffraction light (diffraction optical field) of the sample 121 for the incident light incident at the at least one angle and with the polarization in a polarization-dependent way.

In a method of measuring a 2-D diffraction optical field, temporal and spatial intensity modulation interferometry, including Mach-Zehnder interferometry, phase shifting interferometry, a quantitative phase imaging unit, etc. may be used, or a method of measuring a 2-D diffraction optical field using transport of intensity equation, Fourier ptychography, etc. may be used. Furthermore, 2-D diffraction light may be measured in a polarization-dependent way by using a rotating polarization plate, a liquid-crystal retarder, a meta surface, etc.

In addition to the aforementioned methods of measuring a 2-D diffraction optical field, in order to measure the polarization-dependent optical field, a rotating polarization plate, a liquid-crystal retarder, and a meta surface ahead of a camera may be used as in the aforementioned method of controlling the polarization of the incident light. Furthermore, the polarization-dependent optical field may be measured by using a polarization camera to which a polarization plate is attached ahead of a camera image sensor or using a polarization plate or a polarization beam splitter and two cameras in different directions at once.

After the 2-D diffraction optical field of the sample 121 for the plane wave incident at various angles and in a polarization state is measured in a polarization-dependent way by using such methods, if the theory that overcomes the limit of the existing theory described above is used, the 3-D structure of the birefringence and the alignment direction of molecules of the birefringence sample 121 may be analyzed.

Figure 3:
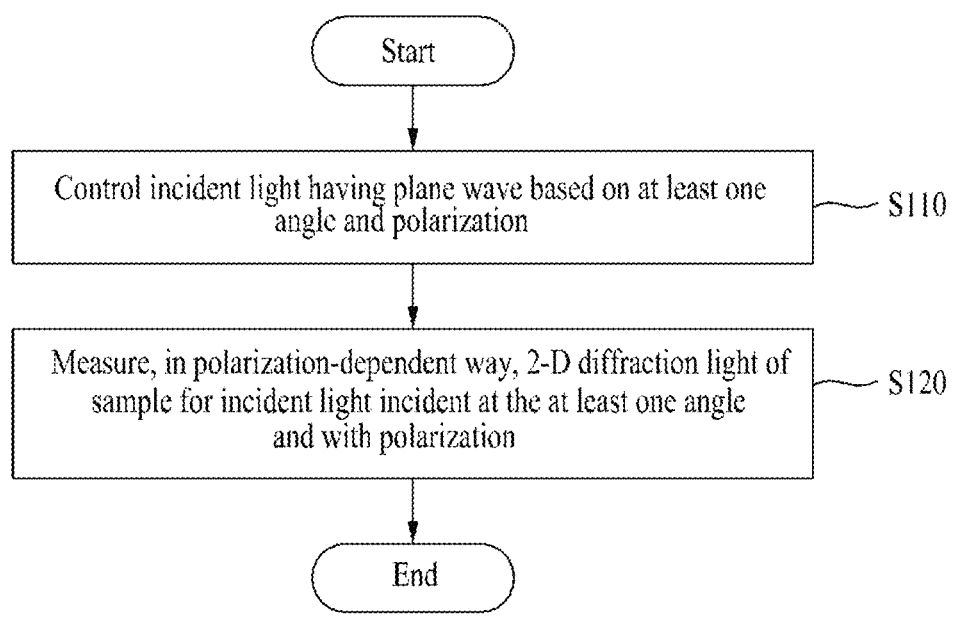
FIG. 3 is a flowchart illustrating a method of measuring a 3-D refractive index tensor according to an embodiment.

FIG. 3 is a flowchart illustrating a method of measuring a 3-D refractive index tensor according to an embodiment. Furthermore, FIG. 4 is a flowchart illustrating a method of controlling incident light of a plane wave with an angle and a polarization according to an embodiment.

Referring to FIG. 3, the method of measuring a 3-D refractive index tensor according to an embodiment may include a step S110 of controlling incident light of a plane wave with at least one angle and a polarization, and a step S120 of measuring, in a polarization-dependent way, 2-D diffraction light of the sample 121 for the incident light incident at the at least one angle and with the polarization. Accordingly, a 3-D structure of the birefringence value and the alignment direction of molecules in the sample 121 having birefringence may be measured.

Figure 4:
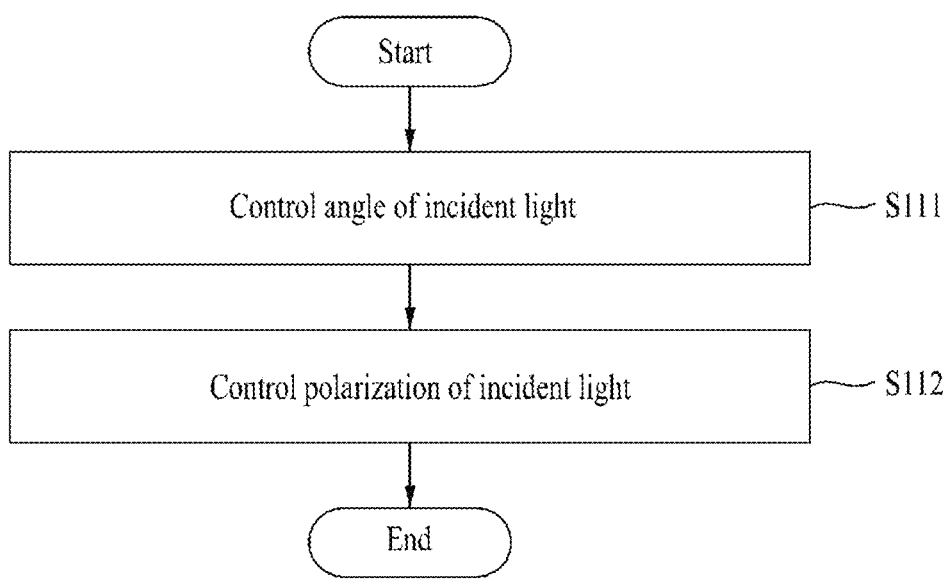
FIG. 4 is a flowchart illustrating a method of controlling incident light of a plane wave with an angle and a polarization according to an embodiment.

Referring to FIG. 4, the step S110 of controlling incident light of a plane wave with at least one angle and a polarization may include a step S111 of controlling the angle of the incident light and a step S112 of controlling the polarization of the incident light.

According to embodiments, a birefringence structure not measured by using the existing technology can be quantitatively imaged in a 3-D way, and Label-free molecular-specific 3D imaging can be implemented by using a measured refractive index value and ratio.

Each of the steps of the method of measuring a 3-D refractive index tensor according to an embodiment is more specifically described.

The method of measuring a 3-D refractive index tensor according to an embodiment may be described by taking, as an example, the apparatus 100 for measuring a 3-D refractive index tensor according to an embodiment described with reference to FIGS. 1 and 2. As described above, the apparatus 100 for measuring a 3-D refractive index tensor according to an embodiment may include the incident light controller 110 and the diffraction light measurement unit 120. In this case, the incident light controller 110 may include the angle controller 111 and the polarization controller 112, and the diffraction light measurement unit 120 may include the wave surface measurement unit 122.

In step S120, the incident light controller 110 may control the incident light of a plane wave with the at least one angle and the polarization.

The incident light controller 110 may control the angle of the incident light. To this end, the incident light controller 110 may control the angle of the incident light by using at least one of a dual mirror, a galvanometric mirror, a deformable mirror, a digital micromirror device, a liquid-crystal spatial light modulator, and a 2-D micro electro mechanical system mirror (MEMS mirror).

Furthermore, the incident light controller 110 may control the polarization of the incident light. To this end, the incident light controller 110 may control the polarization of the incident light by using at least one of a polarization beam splitter, an optical fiber polarization controller, a rotating polarization plate, a liquid-crystal retarder, and a meta surface.

In step S120, the diffraction light measurement unit 120 may measure, in a polarization-dependent way, 2-D diffraction light of the sample 121 for the incident light incident at the at least one angle and with the polarization.

In order to measure, in a polarization-dependent way, the 2-D diffraction light of the sample 121 for the incident light, the diffraction light measurement unit 120 may use temporal and spatial intensity modulation interferometry, including at least any one of Mach-Zehnder interferometry, phase shifting interferometry and a quantitative phase imaging unit or may use a method of measuring 2-D diffraction light using at least one of transport of intensity equation and Fourier ptychography.

Accordingly, a 3-D structure of the birefringence value and the alignment direction of molecules in the sample 121 having birefringence can be measured. The birefringence value and the alignment direction of molecules in the sample 121 having birefringence may be restored into a single layer in a 3-D manner by diagonalizing a measured refractive index tensor by using a tensor feature of a birefringence being due to the spatial rotation of the sample 121 having birefringence.

Figure 5:
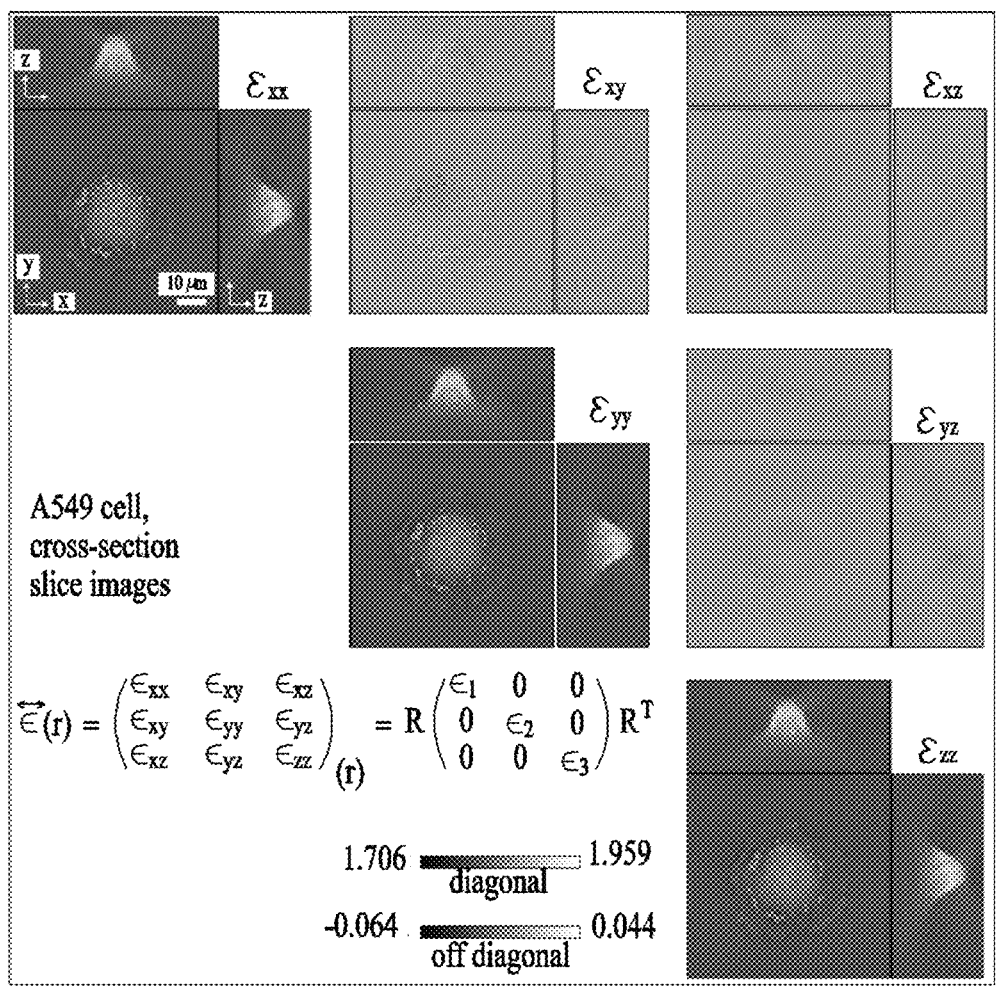
FIG. 5 illustrates the results of measurement of a 3-D refractive index tensor according to an embodiment.

FIG. 5 illustrates the results of measurement of a 3-D refractive index tensor according to an embodiment. In this case, a measured sample is a biological cell (A549 cell; lung cancer cell).

According to embodiments, a distribution of 3-D refractive indices of a sample including a birefringence material can be more accurately measured, and information on a 3-D alignment direction of molecules can also be obtained.

If embodiments are applied, the results of interactions between molecules within a closed space can be optically directly measured by observing a 3-D molecule alignment direction of liquid crystal drops which cannot be directly measured using the existing technologies. Since a frame and muscle fiber have a great polarization compared to surroundings in a biological cell or a tissue sample, the embodiments may also be applied to selective 3-D observation of such a structure without additional labeling. Furthermore, it is expected that the embodiments may also be effectively applied to detection of a production failure in a small plastic lens, etc. because stress attributable to distortion, stretching, etc. in a produced plastic product causes an optical polarization feature.

The aforementioned apparatus may be implemented as a hardware component, a software component and/or a combination of a hardware component and a software component. For example, the apparatus and component described in the embodiments may be implemented using a processor, a controller, an arithmetic logic unit (ALU), a digital signal processor, a microcomputer, a field programmable array (FPA), a programmable logic unit (PLU), a microprocessor or one or more general-purpose computers or special-purpose computers, such as any other apparatus capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, a different processing configuration, such as a parallel processor, is also possible.

Software may include a computer program, a code, an instruction or a combination of one or more of them, and may configure a processing apparatus so that the processing apparatus operates as desired or may instruct the processing apparatuses independently or collectively. The software and/or the data may be embodied in any type of machine, a component, a physical apparatus, a virtual equipment, a computer storage medium or a apparatus in order to be interpreted by the processing apparatus or to provide an instruction or data to the processing apparatus. The software may be distributed to computer systems connected over a network and may be stored or executed in a distributed manner. The software and the data may be stored in one or more computer-readable recording media.

The method according to an embodiment may be implemented in the form of a program instruction executable by various computer means and recorded on a computer-readable recording medium. The computer-readable recording medium may include a program instruction, a data file, and a data structure alone or in combination. The program instruction recorded on the medium may be specially designed and constructed for an embodiment, or may be known and available to those skilled in the computer software field. Examples of the computer-readable medium include magnetic media such as a hard disk, a floppy disk and a magnetic tape, optical media such as a CD-ROM and a DVD, magneto-optical media such as a floptical disk, and hardware devices specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A method of measuring a three-dimensional (3-D) refractive index tensor, comprising:
controlling incident light of a plane wave with at least one angle and a polarization; and
measuring, in a polarization-dependent way, two-dimensional (2-D) diffraction light of a sample for the light at the at least one angle and with the polarization,
wherein a 3-D structure of a birefringence value and an alignment direction of molecules in the sample having birefringence are measured.

2. The method of claim 1, wherein controlling the at least one angle of the incident light includes controlling the at least one angle of the incident light using at least one device selected from a group consisting of: a dual mirror, a galvanometric mirror, a deformable mirror, a digital micromirror device, a liquid-crystal spatial light modulator and a 2-D micro electro mechanical system mirror (MEMS mirror).

3. The method of claim 1, wherein controlling a polarization of the incident light includes controlling the polarization of the incident light using at least one device selected from a group consisting of: a polarization beam splitter, an optical fiber polarization controller, a rotating polarization plate, a liquid-crystal retarder and a meta surface.

4. The method of claim 1, wherein measuring 2-D diffraction light of a sample for the incident light in a polarization-dependent way comprises using temporal and spatial intensity modulation interferometry comprising at least any one of Mach-Zehnder interferometry, phase shifting interferometry and a quantitative phase imaging unit or using a method of measuring the 2-D diffraction light using at least one of transport of intensity equation and Fourier ptychography.

5. The method of claim 1, wherein the birefringence value and the alignment direction of molecules of the sample having birefringence are restored into a single layer in a 3-D manner by diagonalizing a measured refractive index tensor using a tensor feature of the birefringence.

6. An apparatus for measuring a three-dimensional (3-D) refractive index tensor, comprising:
an incident light controller configured to control incident light of a plane wave with at least one angle and a polarization; and
a diffraction light measurement unit configured to measure, in a polarization-dependent way, two-dimensional (2-D) diffraction light of a sample for the incident light at the at least one angle and with the polarization,
wherein a 3-D structure of a birefringence value and an alignment direction of molecules in the sample having birefringence are measured.

7. The apparatus of claim 6, wherein the incident light controller comprises:
an angle controller controlling an angle of the incident light; and
a polarization controller controlling a polarization of the incident light.

8. The apparatus of claim 6, wherein the birefringence value and the alignment direction of molecules of the sample having birefringence are restored into a single layer in a 3-D manner by diagonalizing a measured refractive index tensor using a tensor feature of the birefringence.

* * * * *